(12) United States Patent
Kaneda

(10) Patent No.: US 9,496,965 B2
(45) Date of Patent: Nov. 15, 2016

(54) CHROMATIC DISPERSION COMPENSATOR WITH INTEGRATED ANTI-ALIASING FILTER AND RESAMPLER

(71) Applicant: Alcatel-Lucent USA Inc., Murray Hill, NJ (US)

(72) Inventor: Noriaki Kaneda, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 45 days.

(21) Appl. No.: 14/460,586

(22) Filed: Aug. 15, 2014

(65) Prior Publication Data
US 2016/0050024 A1     Feb. 18, 2016

(51) Int. Cl.
*H04B 10/00* (2013.01)
*H04B 10/06* (2006.01)
*H04B 10/61* (2013.01)
*H04B 10/2575* (2013.01)

(52) U.S. Cl.
CPC ...... *H04B 10/6161* (2013.01); *H04B 10/2575* (2013.01)

(58) Field of Classification Search
CPC  H04B 10/60; H04B 10/613; H04B 10/6161; H04B 10/6971; H04B 10/616; H04J 14/02; H04J 14/0254
USPC ........................................ 398/158, 159, 208
See application file for complete search history.

(56) References Cited

U.S. PATENT DOCUMENTS

| | | | | |
|---|---|---|---|---|
| 8,139,958 B2* | 3/2012 | Elahmadi | ......... | H04B 10/25137 398/208 |
| 8,218,979 B2* | 7/2012 | Liu | ..................... | H04B 10/2513 398/202 |
| 8,792,789 B1* | 7/2014 | Varadarajan | ....... | H04B 10/6161 398/159 |
| 2008/0240221 A1* | 10/2008 | Morris | ................ | H04L 27/3863 375/232 |
| 2010/0329677 A1* | 12/2010 | Kaneda | .................. | H04B 10/60 398/65 |
| 2011/0150478 A1* | 6/2011 | Winzer | .............. | H04B 10/6971 398/65 |
| 2011/0150503 A1* | 6/2011 | Winzer | .................. | H04B 10/60 398/202 |
| 2011/0182582 A1* | 7/2011 | Yang | ...................... | H04B 10/60 398/65 |
| 2012/0099860 A1* | 4/2012 | Zami | .................. | H04B 10/0773 398/45 |
| 2013/0101300 A1* | 4/2013 | Weisser | ............... | H03G 3/3084 398/208 |
| 2013/0163988 A1* | 6/2013 | Krongold | ........... | H04B 10/6971 398/65 |
| 2013/0216239 A1* | 8/2013 | Zhang | .................. | H04B 10/613 398/202 |
| 2013/0223843 A1* | 8/2013 | Jia | ........................... | H04J 14/02 398/79 |
| 2014/0105617 A1* | 4/2014 | Shan | .................. | H04B 10/6161 398/208 |
| 2014/0112424 A1* | 4/2014 | Spinnler | .................. | H03L 7/07 375/354 |
| 2014/0199068 A1* | 7/2014 | Kaneda | .............. | H04B 10/6166 398/65 |
| 2014/0254723 A1* | 9/2014 | Nazarathy | ........... | H04L 27/3872 375/326 |
| 2015/0023659 A1* | 1/2015 | Sun | ..................... | H04J 14/0221 398/34 |

OTHER PUBLICATIONS

U.S. Appl. No. 14/308,756, filed Jun. 19, 2014, entitled "Optical Receiver Having an Equalization Filter With an Integrated Signal Re-Sampler".
U.S. Appl. No. 14/460,593, filed Aug. 15, 2014, entitled "Low Power Equalizer for an Optical Receiver".

\* cited by examiner

*Primary Examiner* — David Payne
*Assistant Examiner* — Pranesh Barua
(74) *Attorney, Agent, or Firm* — Davidson Sheehan LLP

(57) ABSTRACT

A chromatic dispersion compensator to receive a first set of digital signal values produced by sampling an analog signal at a first sampling rate and generate a second set of digital signal values by sampling the first set of digital signal values at a second sampling rate. The chromatic dispersion compensator applies a chromatic dispersion filter and an anti-aliasing filter to the first set of digital signal values.

19 Claims, 4 Drawing Sheets

CHROMATIC DISPERSION COMPENSATOR WITH INTEGRATED ANTI-ALIASING FILTER AND RESAMPLER

BACKGROUND

Field of the Disclosure

The present disclosure relates generally to detection of optical signals and, more particularly, to chromatic dispersion compensation of optical signals.

Description of the Related Art

Digital signal processing (DSP) is widely used for coherent (intradyne or homodyne) detection of optical communication signals in optical transport systems. For example, DSP-based detection of coherent wavelength division multiplexed (WDM) optical signals is widely used for long-haul and metro WDM optical transport networks. The application-specific integrated circuits (ASICs) that have been developed to perform DSP detection of optical signals often require relatively high power consumption, which impedes the development of commercially viable optical transceivers suitable for data rates higher than about 100 gigabits per second (Gbps). Power consumption can be reduced by reducing the sampling rate of the analog-to-digital converters (ADCs) that sample input symbols to produce digital signal values that can be processed to recover the information carried by the symbols. For example, reducing the sampling rate of the ADC from two samples per symbol (SPS) to 1.P SPS (where ".P" represents a decimal fractional value smaller than one so that 1.P<2) can reduce the power consumption by a factor of approximately (2−1.P)/2. However, reducing the sampling rate to a value less than 2 SPS introduces aliasing noise into the digital signal values when the signal bandwidth exceeds the Nyquist limit. The aliasing can be prevented using an analog filter but such anti-aliasing filters with analog components can be difficult or costly to manufacture, particularly if the manufacturing specifications for the anti-aliasing filter are stringent.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided for chromatic dispersion compensation. The apparatus includes a chromatic dispersion compensator to receive a first set of digital signal values produced by sampling an analog signal at a first sampling rate and generate a second set of digital signal values by sampling the first set of digital signal values at a second sampling rate that is different than the first sampling rate. The chromatic dispersion compensator applies a chromatic dispersion filter and an anti-aliasing filter to the first set of digital signal values.

In some embodiments a method is provided for chromatic dispersion compensation. The method includes receiving, at a chromatic dispersion compensator, a first set of digital signal values produced by sampling an analog signal at a first sampling rate. The method also includes applying, at the chromatic dispersion compensator, a chromatic dispersion filter and an anti-aliasing filter to the first set of digital signal values. The method further includes generating, at the chromatic dispersion compensator, a second set of digital signal values by sampling the first set of digital signal values at a second sampling rate that is different than the first sampling rate.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The power consumed by an ASIC during DSP-based detection of coherent optical signals can be significantly reduced without introducing aliasing noise by sampling digital signal samples (each having a certain value) in a chromatic dispersion compensator at a different sampling rate than the sampling rate that was used to sample an analog signal in an analog-to-digital converter to produce the digital signal samples. The chromatic dispersion compensator includes an integrated anti-aliasing filter. The anti-aliasing filter is implemented by transforming the digital signal samples resulting from the sampling to the frequency domain and zeroing a subset of frequencies within the bandwidth of the frequency domain signal. For example, if the digital signal samples resulting from the sampling process are sampled at a lower sampling rate of 1.2 SPS relative to an initial sampling rate of 2 SPS, approximately 40% of the bandwidth of the frequency domain signal may be zeroed out. The subset of the frequency domain may be zeroed out concurrently with multiplying the frequency domain signal by an inverse chromatic dispersion coefficient used for chromatic dispersion compensation. Sampling of the digital signal samples (or digital signal values resulting from sampling an analog signal) at the lower sampling rate may then be performed by dropping components of the frequency domain signal that correspond to the zeroed out frequencies. No aliasing noise is generated because the anti-aliasing filter implemented in the chromatic dispersion compensator zeros out the aliasing frequencies in the digital frequency domain signal, i.e., the anti-aliasing filter is a substantially ideal filter.

Figure 1:
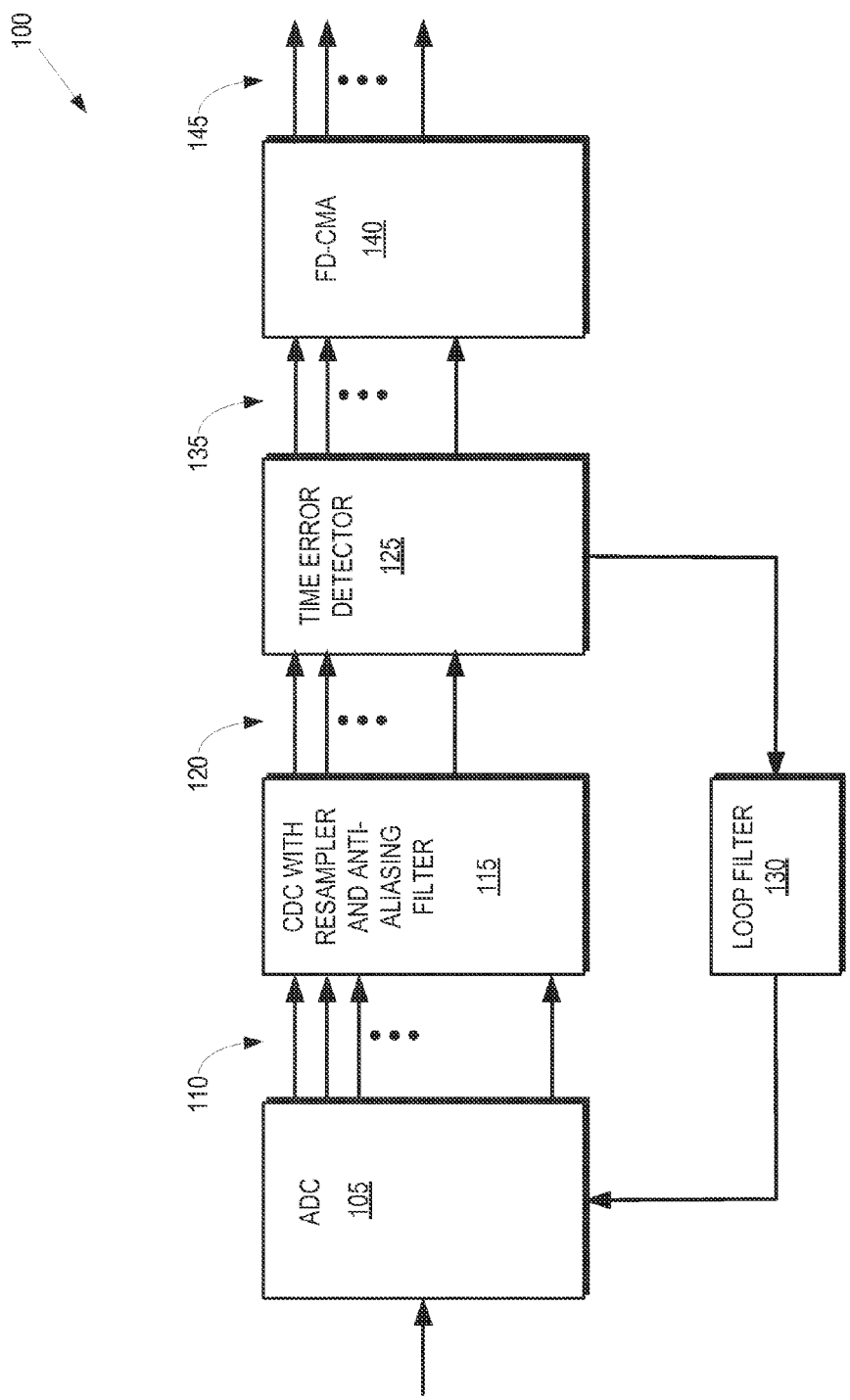
FIG. 1 is a block diagram of a portion of an application-specific integrated circuit (ASIC) for digital signal processing (DSP) of coherent optical transmission signals according to some embodiments.

FIG. 1 is a block diagram of a portion 100 of an application-specific integrated circuit (ASIC) for digital signal processing (DSP) of coherent optical transmission signals according to some embodiments. The portion 100 includes an analog-to-digital converter (ADC) 105 that converts a continuous electrical signal (such as a voltage) representative of symbols conveyed in the coherent optical transmission signals into a set of digital samples each having a value that represents the optical signal. Each such digital sample is hereinafter referred to as a digital signal value. Some embodiments of the ADC 105 sample the continuous electrical signal at a predetermined sampling rate. For example, the ADC 105 may sample the continuous electrical signal at a sampling rate of two symbols per second (2 SPS). The ADC 105 generates a set of QN complex values to represent each symbol conveyed in the coherent optical transmission signals. In some embodiments, Q and N are positive integers. The QN complex values for each symbol are concurrently asserted in parallel on QN lines 110.

Chromatic dispersion may cause the optical signals representative of the symbols to spread (or disperse) as they propagate through optical fibers prior to arriving at the portion 100 of the ASIC, which may degrade the optical signals. The portion 100 therefore includes a chromatic dispersion compensator (CDC) 115 to compensate for the effects of chromatic dispersion. Some embodiments of the CDC 115 may perform frequency domain equalization by applying a frequency dependent transfer function to different frequency components of the sampled signals generated by the ADC 105, as discussed herein. Frequency dependent transfer functions for performing frequency domain equalization for chromatic dispersion compensation are known in the art.

The CDC 115 also incorporates an anti-aliasing filter to filter a subset of the frequency components of the sampled signals. Some embodiments of the CDC 115 may therefore filter the sampled signals (i.e., the set of digital values where each value represents a sample) by applying a transfer function that combines two frequency dependent transfer functions: (1) the frequency dependent transfer function used for chromatic dispersion compensation and (2) a frequency dependent transfer function that filters the subset of the frequency components that may include alias signals, as discussed herein. Thus, both chromatic dispersion compensation and anti-aliasing filtering may be performed in a single integrated operation in the CDC 115.

The CDC 115 further incorporates resampling logic to sample the set of digital values (i.e., set of samples) at a second (smaller or different) sampling rate. For example, the CDC 115 may sample the digital values at a smaller sampling rate to reduce the QN received samples to QM samples, where M<N. The QM samples may then be concurrently asserted in parallel on QM lines 120. Sampling the digital values in the CDC 115 at a lower sampling rate can significantly reduce power consumption in components of the portion 100 of the ASIC that are downstream from the CDC 115. Assuming the QN samples were obtained by sampling the analog signal at a rate of 2 SPS, some embodiments of the CDC 115 may sample the QN samples at a rate of 1.P SPS (where ".P" is a decimal fractional value smaller than one), instead of 2 SPS, which may reduce the power consumption of the downstream components by a factor of approximately (2−1.P)/2. For example, if the CDC 115 samples the QN samples at 1.2 SPS instead of 2 SPS, the number of multipliers amended in the downstream components may be reduced by 40% per symbol and the number of parallel lines downstream from the CDC 115 may also be reduced by about 40%. Moreover, the anti-aliasing filtering performed in the CDC 115 may be substantially ideal and the reduced aliasing may improve the performance of downstream components, as discussed herein. Conventional ASICs for DSP may include an independent second sampler (i.e., sampler in addition to that of the ADC) that is external to a CDC on the ASIC. The external CDC may sample the samples at 1.2 SPS instead of 2 SPS sample rate applied by the ADC. Some embodiments of the CDC-integrated sampler (i.e., second sampler) described herein remove the need for an independent external sampler and therefore reduce the power consumption of the implemented device.

Some embodiments of the portion 100 of the ASIC include a timing error detector 125 for detecting timing errors in the signals asserted on the lines 120. The timing error detector 125 may provide feedback information representative of the timing errors to the ADC 105 so that the ADC 105 can correct for the timing errors. The feedback may be provided via a loop filter 130. The timing error detector 125 may also pass through the QM samples and assert them concurrently in parallel on QM lines 135.

Some embodiments of the portion 100 of the ASIC include a frequency domain constant modulus algorithm (FD-CMA) filter 140. For example, the FD-CMA 140 may be used to calculate coefficients for a finite impulse response (FIR) filter. The FD-CMA 140 may perform a second sampling of the digital signal values at a relatively lower (or different) sampling rate as compared to the sampling rate of the ADC 105 or the sampling rate of the CDC 115. For example, if the CDC 115 samples the digital signal values (obtained from sampling an analog signal at a rate of 2 SPS in the ADC 105) at a rate of 1.P SPS instead of 2 SPS, the FD-CMA 140 may further sample the digital signal values received from the CDC 115 at a sampling rate of 1.0 SPS instead of the sampling rate of 1.P SPS used by the CDC 115. The signals sampled by FD-CMA 140 may then be concurrently asserted in parallel on lines 145. The reduction in aliasing produced by the integrated anti-aliasing filter may improve performance of the FD-CMA 140 relative to the performance of the FD-CMA 140 in conventional optical signal processing ASICs that utilize 2 SPS for components upstream from the FD-CMA 140.

Figure 2:
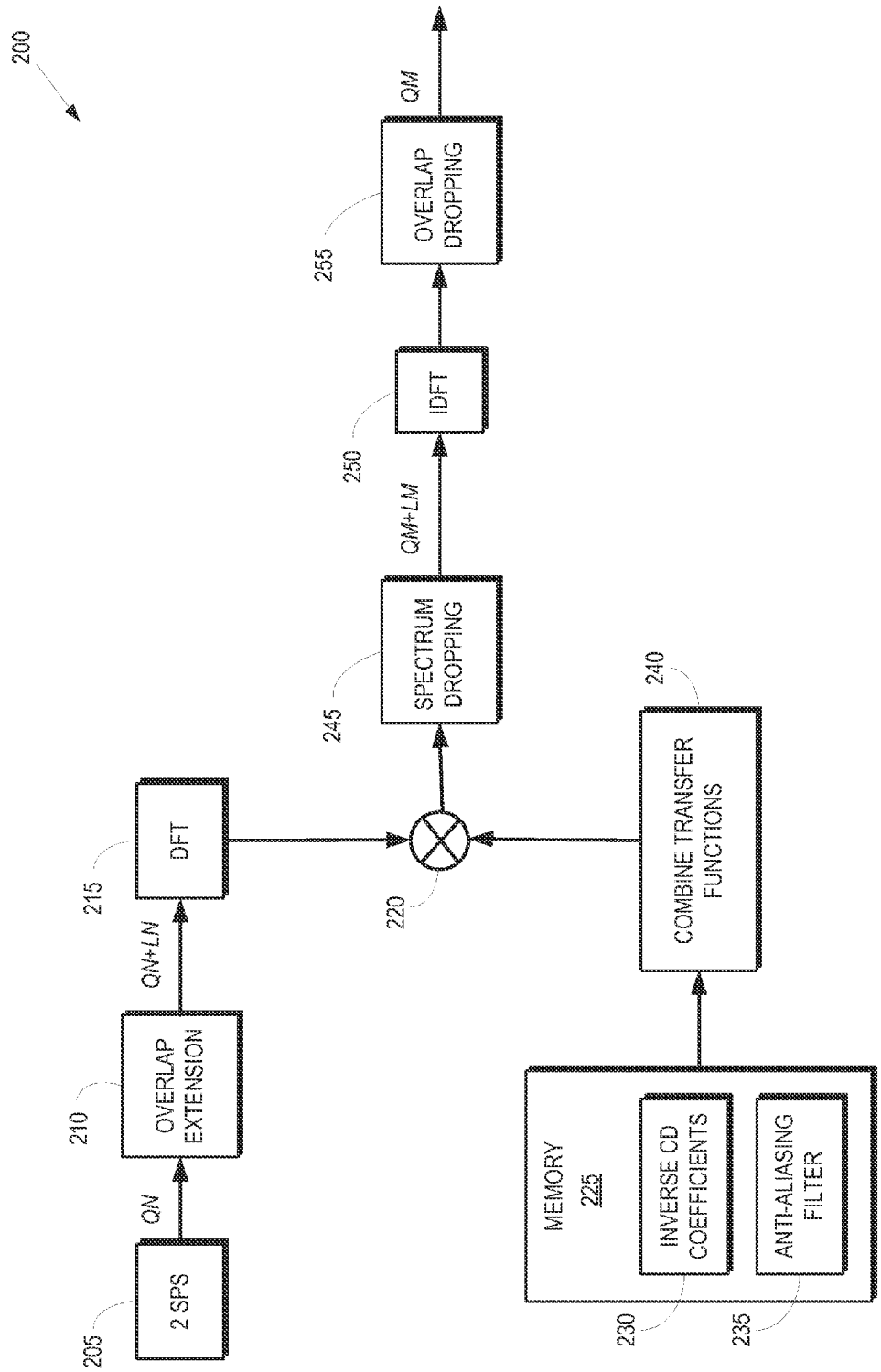
FIG. 2 is a block diagram of a chromatic dispersion compensator (CDC) with integrated anti-aliasing filtering and resampling according to some embodiments.

FIG. 2 is a block diagram of a chromatic dispersion compensator (CDC) 200 with integrated anti-aliasing filtering and resampling according to some embodiments. The CDC 200 may be used to implement some embodiments of the CDC 115 shown in FIG. 1. The CDC 200 receives digital signal values (i.e., digital samples) produced by sampling an analog signal at a first sampling rate such as the 2 SPS signal source 205, which may correspond to the concurrent parallel signals received over the lines 110 from the ADC 105 shown in FIG. 1. An overlap extension block (which may be referred to as an overlap extender) 210 may be used to extend the sampled signals by adding previous signals that were produced by sampling the analog signal at the first sampling rate during an earlier time interval. For example, the QN sampled signals may be extended by LN samples to create an extended set of QN+LN sampled signals. Extending the set of signals may improve the representation of the signals in the frequency domain. A discrete Fourier transform (DFT) block 215 is used to transform the extended set of QN+LN sampled signals into a corresponding set of frequency components that represent the sampled signals. The set of frequency components may then be provided to a multiplier 220.

Some embodiments of the CDC 200 include a memory 225, which may be implemented using various types of memory such as dynamic random access memory (DRAM), static random access memory (SRAM), and the like. The memory 225 stores information identifying the inverse chromatic dispersion (CD) coefficients 230 that are used to define a transfer function that compensates for chromatic dispersion in the signals. The memory 225 also stores information identifying an anti-aliasing filter 235. In some embodiments the anti-aliasing filter 235 may define zero padding that is applied to the frequency components to effect anti-aliasing filtering in the CDC 200. For example, the anti-aliasing filter 235 may indicate a subset of the frequency components that are to be set to zero, or to be zeroed out, to remove frequency components that may include aliasing signals.

Combinational logic is used to combine the inverse chromatic dispersion coefficients 230 and the anti-aliasing filter 235 to form a combined transfer function 240 that represents chromatic dispersion compensation and anti-aliasing filtering. For example, the combination logic may generate a combined transfer function 240, $H_{com}$:

$$H_{com} = H_{zp} \times H_{cd},$$

where $H_{zp}$ is a transfer function that represents the anti-aliasing filter 235, and $H_{cd}$ is a transfer function that represents the inverse chromatic dispersion coefficients 230. The combined transfer function may then be provided to the multiplier 220, which can multiply the combined transfer function and the frequency components provided by the DFT 215.

A spectrum dropping block 245 modifies the corrected and filtered frequency components provided by the multiplier 220 by dropping a subset of the frequency components that corresponds to the subset of the frequency components set to zero in the application of anti-aliasing filtering. Some embodiments of the spectrum dropping block 245 may remove the subset of frequency components and provide the remaining subset of the frequency components to an inverse DFT (IDFT) 250 to transform the frequency components back into a set of time domain sample signals. In the interest of clarity, the spectrum dropping block 245 is shown as a separate functional block that is implemented after the multiplier 220. However, in some embodiments, the frequency components are dropped from the signals provided by the DFT 215 and the transfer function coefficients provided by block 240 before performing the multiplications in the multiplier 220. Performing spectrum dropping prior to performing the multiplications may significantly reduce the computational effort required to perform complex number multiplication in the multiplier 220. Dropping the frequency components results in a sampled set of time domain signals that are representative of a set of digital signal values sampled at a lower sampling rate, e.g. a sampling rate of 1.P SPS. For example, the IDFT 250 may generate an extended set of QM+LM sampled signals. An overlap dropping block 255 may be used to remove the sampled signals corresponding to the LN samples that were added by the overlap extension block 210 to create the extended set of QN+LN sampled signals. The CDC 200 may then provide the QM sampled signals to downstream component such as the time error detector 125 shown in FIG. 1.

Figure 3:
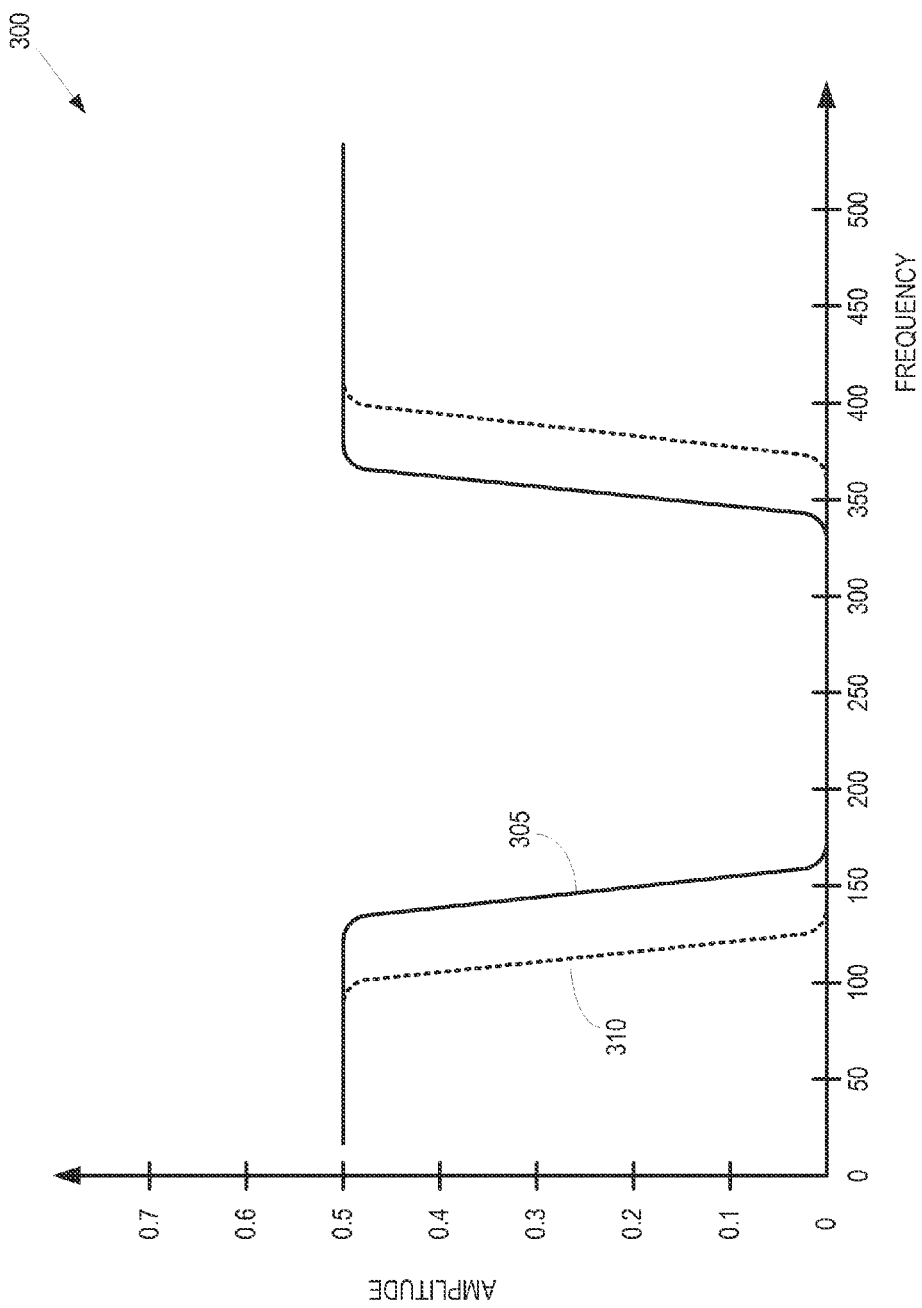
FIG. 3 is a plot of zero padding transfer functions according to some embodiments.

FIG. 3 is a plot 300 of zero padding transfer functions 305, 310 according to some embodiments. The zero padding transfer function 305, 310 may be represented by information 235 stored in the memory 225 and may be used for anti-aliasing filtering in the CDC 200 shown in FIG. 2. The vertical axis indicates amplitude in arbitrary units and the horizontal axis indicates frequency components in DFT points. The zero padding transfer function 305 zeros out frequencies between approximately 150 and 350, and the zero padding transfer function 310 zeros out frequencies between approximately 130 and 380. Thus, the zero padding transfer function 310 zeros out a larger range of frequency components and may therefore be used for anti-aliasing filtering when the CDC samples at relatively smaller sampling rates. For example, the zero padding transfer function 305 may be used for anti-aliasing filtering in embodiments of the CDC that sample at 1.2 SPS instead of the 2 SPS sampling rate used by the ADC and the zero padding transfer function 310 may be used for anti-aliasing filtering in embodiments of the CDC that sample at 1.0 SPS instead of the 2 SPS sampling rate used by the ADC.

Figure 4:
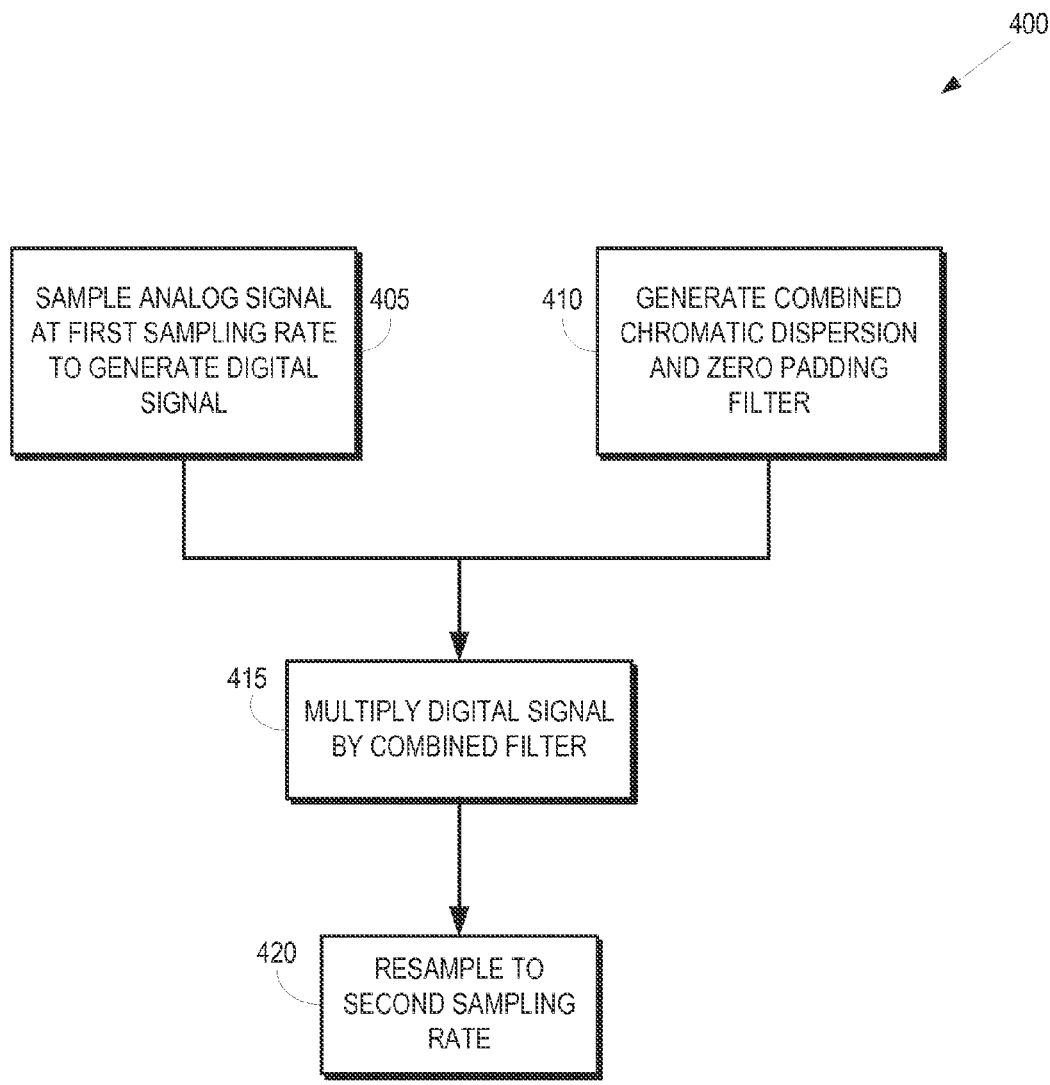
FIG. 4 is a flow diagram of a method for resampling a signal using a CDC with an integrated anti-aliasing filter according to some embodiments.

FIG. 4 is a flow diagram of a method 400 for sampling digital signal values (resulting from sampling an analog signal) using a CDC with an integrated anti-aliasing filter according to some embodiments. The method 400 may be implemented in the CDC 115 shown in FIG. 1 or the CDC 200 shown in FIG. 2. At block 405, an analog signal is sampled at a first sampling rate to generate a first set of digital signal values. For example, an ADC such as the ADC 105 shown in FIG. 1 may sample the analog signal at 2 SPS. At block 410, the CDC may generate a transfer function for a combined chromatic dispersion filter and zero padding (anti-aliasing) filter. Sampling of the analog signal at block 405 and generation of the transfer function at block 410 may be performed in any order or concurrently. At block 415, the first set of digital signal values is multiplied by the transfer function for the chromatic dispersion and zero padding filters. At block 420, the filtered signal is modified to produce a second set of digital signal values representative of the first set of digital signal values sampled at a second sampling rate. For example, frequency components corresponding to the zero padding may be dropped and the filtered signal may be sampled at 1.P SPS instead of the 2 SPS sampling rate, as discussed herein. Some embodiments of the method 400 may be used to down-sample so that a ratio of the first sampling rate to the second (down-sampled) sampling rate is N/M, where M and N are integers and N<M. Some embodiments of the method 400 may also be used to up-sample from lower sampling rates to higher sampling rates using zero padding instead of zero dropping, e.g., in some embodiments of the spectrum dropping block 245 shown in FIG. 2. For example, the method 400 may be used to up-sample so that a ratio of the first sampling rate to the second (up-sampled) sampling rate is N/M, where M and N are integers and N>M.

Embodiments of the CDC with integrated anti-aliasing filtering and resampling may significantly reduce the power consumption in DSP for optical coherent detection without incurring performance degradation. For example, sampling digital signal values provided by an ADC at a rate of 1.2 SPS, where such provided signal was obtained by sampling an analog signal at 2 SPS may, in an embodiment of the CDC, reduce power consumption downstream from the CDC by approximately 40% without incurring any noticeable performance degradation. Furthermore, embodiments of the CDC described herein can support a flexible sampling rate with respect to the symbol rate, e.g., the CDC can receive various different symbol rates without needing to change the sample rate, which is often physically fixed to particular ranges. Embodiments of the CDC described herein may also be more reliable relative to devices that use sample signals that the ADC originally sampled at lower sampling rates, such as 1.2-SPS and 1.0-SPS, with minimal increase in the power consumption relative to these devices. The CDC may also be able to receive and effectively process signals that were shaped with different pulse shapes.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
a chromatic dispersion compensator configured to receive a first set of digital signal values produced by sampling an analog signal at a first sampling rate and to generate a second set of digital signal values by sampling the first set of digital signal values at a second sampling rate that is different than the first sampling rate, wherein the chromatic dispersion compensator is configured to apply a chromatic dispersion filter and an anti-aliasing filter to a first plurality of frequency components of the first set of digital signal values, and wherein the chromatic dispersion filter is configured to use inverse chromatic dispersion coefficients, and wherein the anti-aliasing filter is configured to set to zero a subset of the first plurality of frequency components.

2. The apparatus of claim 1, further comprising:
an analog-to-digital converter to generate the first set of digital signal values by sampling the analog signal at the first sampling rate.

3. The apparatus of claim 1, wherein the first sampling rate is two samples per symbol and the second sampling rate is 1.P samples per symbol, wherein ".P" represents a decimal fractional value smaller than one so that 1.P<2.

4. The apparatus of claim 1, wherein a ratio of the first sampling rate to the second sampling rate is N/M, and wherein N and M are integers equal to 1 or greater.

5. The apparatus of claim 1, wherein the chromatic dispersion compensator comprises an overlap extender to combine the first set of digital signal values with a plurality of previous digital signal values sampled at the first sampling rate to form a first extended set of digital signal values, and wherein the chromatic dispersion compensator comprises a discrete Fourier transform to transform the first extended set of digital signal values to the first plurality of frequency components.

6. The apparatus of claim 5, wherein the chromatic dispersion compensator comprises a memory to store information indicating the zero padding for the anti-aliasing filter and information indicating the inverse chromatic dispersion coefficients.

7. The apparatus of claim 6, wherein the chromatic dispersion compensator comprises a combiner to generate a combined transfer function using the information indicating the anti-aliasing filter and the information indicating the inverse dispersion coefficients.

8. The apparatus of claim 7, wherein the chromatic dispersion compensator comprises a multiplier to multiply the first plurality of frequency components and the combined transfer function.

9. The apparatus of claim 8, wherein the chromatic dispersion compensator comprises a spectrum dropping block to drop a subset of the first plurality of frequency components corresponding to zero-padded frequency components.

10. The apparatus of claim 9, wherein the chromatic dispersion compensator comprises an inverse discrete Fourier transform to transform a remaining subset of the first plurality of frequency components to form a second extended set of digital signal values, and wherein the chromatic dispersion compensator comprises an overlap dropper to drop a subset of the second extended set of digital signal values to generate the second set of digital signal values.

11. A method, comprising:
receiving, at a chromatic dispersion compensator, a first set of digital signal values produced by sampling an analog signal at a first sampling rate;
applying, at the chromatic dispersion compensator, a chromatic dispersion filter and an anti-aliasing filter to the first set of digital signal values, wherein applying the chromatic dispersion filter comprises applying inverse chromatic dispersion coefficients, and wherein applying the anti-aliasing filter comprises setting to zero a subset of a first plurality of frequency components of the first set of digital signal values; and generating, at the chromatic dispersion compensator, a second set of digital signal values by sampling the first plurality of digital signal values at a second sampling rate that is different than the first sampling rate.

12. The method of claim 11, further comprising:
generating, at an analog-to-digital converter, the first set of digital signal values by sampling the analog signal at the first sampling rate.

13. The method of claim 11, wherein the first sampling rate is two samples per symbol and the second sampling rate is 1.P samples per symbol, wherein ".P" represents a decimal fractional value smaller than one so that 1.P<2.

14. The method of claim 11, wherein a ratio of the first sampling rate to the second sampling rate is N/M, and wherein N and M are integers.

15. The method of claim 11, further comprising:
combining the first set of digital signal values with a set of previous digital signal values sampled at the first sampling rate to form a first extended set of digital signal values and transforming the first extended set of digital signal values to the first plurality of frequency components.

16. The method of 15, wherein applying the chromatic dispersion filter and the anti-aliasing filter comprises generating a combined transfer function using information indicating the zero padding and information indicating the inverse dispersion coefficients and multiplying the first plurality of frequency components and the combined transfer function.

17. The method of claim 16, further comprising:
dropping a subset of the first plurality of frequency components corresponding to zero-padded frequency components.

18. The method of claim 17, further comprising:
transforming a remaining subset of the first plurality of frequency components to form a second extended set of digital signal values.

19. The method of claim 18, further comprising:
dropping a subset of the second extended set of digital signal values to generate the second set of digital signal values.

* * * * *